(12) United States Patent
Wu et al.

(10) Patent No.: US 10,301,452 B2
(45) Date of Patent: May 28, 2019

(54) MONO-AZIDE COMPOUND FOR PHOTO-INDUCED CROSS-LINKING POLYMER STRANDS

(71) Applicant: BASF SE, Ludwigshafen (DE)

(72) Inventors: Chao Wu, Mannheim (DE); Fulvio G. Brunetti, Singapore (SG); Stefan Becker, Seoul (KR); Maximilian Hemgesberg, Kaiserslautern (DE)

(73) Assignee: BASF SE, Ludwigshafen (DE)

( * ) Notice: Subject to any disclaimer, the term of this patent is extended or adjusted under 35 U.S.C. 154(b) by 2 days.

(21) Appl. No.: 15/528,966

(22) PCT Filed: Nov. 23, 2015

(86) PCT No.: PCT/EP2015/077381
§ 371 (c)(1),
(2) Date: May 23, 2017

(87) PCT Pub. No.: WO2016/083314
PCT Pub. Date: Jun. 2, 2016

(65) Prior Publication Data
US 2017/0267833 A1   Sep. 21, 2017

(30) Foreign Application Priority Data

Nov. 24, 2014 (EP) .................................... 14194512

(51) Int. Cl.
*C08K 5/28* (2006.01)
*C08K 5/00* (2006.01)
(Continued)

(52) U.S. Cl.
CPC ............. *C08K 5/28* (2013.01); *C08F 8/30* (2013.01); *C08J 3/28* (2013.01); *C08K 5/0025* (2013.01);
(Continued)

(58) Field of Classification Search
None
See application file for complete search history.

(56) References Cited

U.S. PATENT DOCUMENTS 3,238,230 A 3/1966 Haszeldine et al.
2009/0004402 A1 1/2009 Ho et al.
(Continued)

FOREIGN PATENT DOCUMENTS

EP 0 019 726 A1 12/1980
WO WO 2011/068482 A1 6/2011

OTHER PUBLICATIONS

International Search Report dated Mar. 23, 2016 in PCT/EP2015/077381.

(Continued)

*Primary Examiner* — Shamim Ahmed
*Assistant Examiner* — Bradford M Gates
(74) *Attorney, Agent, or Firm* — Oblon, McClelland, Maier & Neustadt, L.L.P.

(57) ABSTRACT

The present invention relates to the use of a mono-azide compound for cross-linking polymer strands, wherein said mono-azide compound has a structure of the formula (I): (I), wherein $Q^1$ and $Q^2$ are each independently from another a halogen and wherein $R^1$, $R^2$ and $R^3$ are each independently from another any not comprising an azido moiety. Further, the present invention relates to a method for cross-linking polymer stands and to a cross-linked polymer composition obtainable from said method and an electronic device comprising such composition.

(Continued)

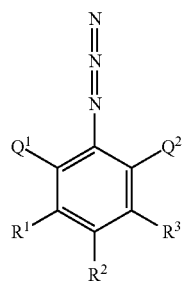

(I)

14 Claims, 5 Drawing Sheets

(51) Int. Cl.
*C08K 5/23* (2006.01)
*C08F 8/30* (2006.01)
*C08J 3/28* (2006.01)
C08L 25/06 (2006.01)

(52) U.S. Cl.
CPC ............ *C08K 5/23* (2013.01); *C08F 2810/20* (2013.01); *C08L 25/06* (2013.01); *C08L 2312/06* (2013.01)

(56) References Cited

U.S. PATENT DOCUMENTS

2010/0291484 A1* 11/2010 Tanaka .................. G03F 7/0045 430/270.1
2012/0244294 A1 9/2012 Ho et al.
2012/0258313 A1* 10/2012 Wen ..................... C09D 131/00 428/412
2013/0032376 A1* 2/2013 Fagrell ................ C08L 23/0846 174/120 SC

OTHER PUBLICATIONS

A. Reiser et al., "Effect of Matrix Rigidity on the Reactions of Aromatic Nitrenes in Polymers" Transactions of the Faraday Soc., vol. 67, 1971, pp. 2389-2396.
G.A. Delzenne, "Photographic applications of photopolymers: Photophysical and photochemical Aspects", Ind. Chim. Belg., vol. 39, 1974, pp. 249-265.
J.L.R. Williams, "Photoreactive Polymers", Polyelectrolytes, 1974, pp. 507-528.
J.J. Cottart et al., "Photochemistry of Polymeric Systems. IV. Photocrosslinking of Copolymers Including Pyridinium Dicyanomethylide Groups", Journal of Applied Polymer Science, vol. 26, 1981, pp. 1233-1241.
T. Iwayanagi et al., "Azide-Phenolic Resin UV Resist (MRL) for Microlithography", Polymer Engineering and Science, vol. 23, No. 17, 1983, pp. 935-940.
M. Hashimoto et al., "Photochemistry of Azide-Phenolic Resin Photoresists" Polymer Engineering and Science, vol. 26, No. 16, 1986, pp. 1090-1095.
S. Nonogaki, "High-Resolution Negative Photoresists Composed of Phenolic Resin and Aromatic Azide", Polymer Journal, vol. 19, No. 1, 1987, pp. 99-104.
C.C. Han et al., "Mechanism study of deep-UV irradiated poly(methyl methacrylate)-azide resist system", Radiation Effects and Defects in Solids, vol. 111 & 112, 1989, pp. 45-58 (with cover page).
Mingdi Yan et al., "N-Hydroxysuccinimide Ester Functionalized Perfluorophenyl Azides as Novel Photoactive Heterobifunctional Cross-Linking Reagents. The Covalent Immobilization of Biomolecules to Polymer Surfaces", Bioconjugate Chem., vol. 5, 1994, pp. 151-157.
International Preliminary Report on Patentability and Written Opinion dated May 30, 2017 in PCT/EP2015/077381.

* cited by examiner

MONO-AZIDE COMPOUND FOR PHOTO-INDUCED CROSS-LINKING POLYMER STRANDS

The present invention relates to the use of a mono-azide compound for photo-induced cross-linking polymer strands, wherein said mono-azide compound has a structure of the formula (I):

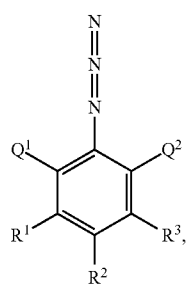

wherein $Q^1$ and $Q^2$ are each independently from another a halogen and wherein $R^1$, $R^2$ and $R^3$ are each independently from another any residue not comprising an azido moiety. Further, the present invention relates to a method for cross-linking polymer stands and to a cross-linked polymer composition obtainable from said method and an electronic device comprising such composition.

Today, efficient cross-linking of polymers plays an important role for a number of applications. In particular when preparing electronic devices, selective cross-linking of polymers is regularly desired. Further, preparing electronic devices often additionally comprises structuring (also known as patterning) of various layers, such as, e.g., of the electrodes, semiconductor layers, dielectric layers and/or barrier layers.

A convenient strategy for structuring a layer of a device is preparing layers by means of solution processing. Herein, one or more polymers are typically dissolved in a solvent suitable therefor and a layer of the obtained solution is formed on the surface of a part of the device. This can be exemplarily performed means spin coating, spraying and/or printing. Subsequently, the solvent is evaporated and the polymer layer is dried.

A drawback of such procedures is that the solvent the one or more polymers are dissolved in can also affect the surface of the part of the device (often also composed of polymers) it is contacted with. This can be prevented by choosing orthogonal solvents specifically dissolving particular polymers but not affecting the part of the device. This however limits the applicability of many common solvents and prevents preparing two adjacent layers comprising the same type of polymers.

A suitable strategy to overcome such problem is cross-linking the polymers comprised in a once formed part of a device and thereby reducing their solubility. This enables to use the same or similar solvents to prepare further layers without disturbing the integrity of the prepared parts of the device. Further, as cross-linking significantly decreases solubility of the cross-linked polymers in comparison to their non-cross-linked counterparts, also two adjacent layers comprising the same type of polymer can be prepared.

Depending on the employed compounds, cross-linking can be performed by different means. Typically, the means known in the art base on the incorporation of a bifunctional cross-linking moiety into the polymer composition of which one active group is able to covalently bind to one polymer strand and the other one covalently to another polymer strand.

Herein, initiation of the cross-linking reaction can be performed by different means such as, e.g., by chemical initiation, by thermal initiation or by irradiation initiation. Initiation of cross-linking reaction bears the advantage of enabling spatial specificity. Herein, by means of masking and site-specific irradiation, the cross-linking may be initiated specifically locally. Therefore, cross-linking and structuring can be combined in a single step. The residual non-cross-linked polymer can optionally be subsequently removed by one or more washing steps of washing with a suitable solvent, whereas the cross-linked polymers remain in place. This procedure is also known as photolithography. In the early 1970s, the effect of polymer matrix rigidity on the reaction of aromatic azido compounds, such as azido naphtalene, to primary and secondary amines has been investigated, wherein the reaction is initiated by means of a UV lamp (Reiser et al., 1971). Briefly later, the structure and photolysis of an arylazide group was theoretically analyzed with a focus on arylazido polymers comprising a number of monomers bearing azido moieties (Delzenne, 1974). Photoreactive polymers, including such bearing azido moieties, were further described by J. L. R. Williams (Williams; 1974). Further, photo-crosslinking of polymers was generally described (Cottart, 1981).

These polymer-based methods bear the significant disadvantage that only special polymers comprising special monomers bearing activated cross-linkable groups can be used. First, it is evidently desirable to use commonly used polymers and to avoid laborious, time-consuming and costly preparation of special polymers. Second, such polymers bear different chemical and physicochemical properties in comparison to non-functionalized polymers that may be undesired. Third, such polymers are less stable and have a shorter shelf-life comparison to non-functionalized polymers.

Therefore, means enabling the cross-linking of non-functionalized polymers have been developed. For the purpose of photo-induced cross-linking, beside others, bifunctional bis-azide compounds have been successfully used. A variety of azido-based cross-linking agents that are added to a polymer composition have been developed (Iwayanagi et al., 1983, Hashimoto et al, 1986; Nonogaki, 1987; Han and Corelli, 1989). US 2009/0004402 and WO 2011/068482 disclose bis-azide-type compounds that bear a comparably complex structure. EP 0 019 726 refers to maleimide-based sulfonyl azide compounds. Yan et al., 1994, discloses rather complex bi-functional compounds comprising an azide moiety and an N-hydroxysuccinimide active ester moiety. These bi-functional compounds worked as cross-linking agents for polymers by means of linking two polymer strands with another by binding a polymer strand with each functional group. No optimal results were obtained. Further, most of the compounds described in the art are rather difficult to synthesize.

In contrast to bifunctional bis-azide compounds, mono-azide compounds that are easier to be synthesized were considered to be not efficient in cross-linking polymer strands.

In the view of the above, there is still an unmet need for improved means for photo-induced cross-linking of polymers. Desirably, such means are compounds that are easily obtainable by straight-forward syntheses, are rather stable under storage conditions and enable efficient cross-linking.

Surprisingly, it has been found that for the use of mono-azide benzenic compounds (i.e., monofunctional agents) that are at least halogenated at the carbon atoms of the benzene adjacent to the azido moiety may serve as effective photo-inducible agents for initiating radical-driven cross-linking of polymer strands. Such mono-azide benzenic compounds can be obtained by a straightforward synthesis from the respective halogenated aniline compounds. The synthesis of such compounds has been described previously (U.S. Pat. No. 3,238,230), but to our best knowledge such compounds have not been used as photo-inducible initiators for cross-linking.

In a first aspect, the present invention relates to the use of a mono-azide compound for photo-induced cross-linking polymer strands, wherein said mono-azide compound has a structure of the formula (I):

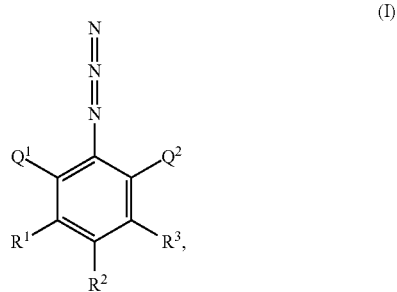

wherein $Q^1$ and $Q^2$ are each independently from another a halogen, and
wherein $R^1$, $R^2$ and $R^3$ are each independently from another any residue not comprising an azido moiety.

Herein, the term "photo-induced cross-linking" may be understood in the broadest sense as any process of cross-linking that may be initiated by the excitation with light (photo initiation). Then, the compound of the present invention may serve as the initiator triggering the cross-linking between polymer strands. Most preferably, the compounds of the present invention will, upon being excited by light (photo-induced) generate polymer radicals that may react with polymer side chains. Upon the reaction of two radicals located on different polymer strands with another, a covalent bond between the two polymer strands in formed. The term "photo-induced cross-linking" may be understood interchangeably with "photo-initiated cross-linking", "photo-promoted cross-linking", "photo-triggered cross-linking" and the like. Accordingly, the present invention, a mono-azide compound for photo-induced cross-linking polymer strands may be also designated as "(photo) promoter", "(photo) initiator", "(photo) triggering agent" or similar. Preferably, irradiating with light of a suitable wavelength and strength activates said mono-azide compound in a way that it initiates the generation of radicals ("radical formation") of polymer strands to be cross-linked and thereby triggers the cross-linking of the polymer strands.

A mono-azide compound as used herein bears merely a single azide moiety. Accordingly, none of residues $R^1$, $R^2$ and $R^3$ bears a further azide moiety.

$Q^1$ and $Q^2$ may each be any halogen. Exemplarily, $Q^1$ and $Q^2$ are both fluorine (F). Alternatively, $Q^1$ and $Q^2$ are both chlorine (Cl). Alternatively, $Q^1$ and $Q^2$ are both bromine (Br). Alternatively, $Q^1$ and $Q^2$ are both iodine (I). Alternatively, $Q^1$ is F and $Q^2$ is Cl. Alternatively, $Q^1$ is F and $Q^2$ is Br. Alternatively, $Q^1$ is F and $Q^2$ is I. Alternatively, $Q^1$ is Cl and $Q^2$ is F. Alternatively, $Q^1$ is Cl and $Q^2$ is Br. Alternatively, $Q^1$ is Cl and $Q^2$ is I. Alternatively, $Q^1$ is Br and $Q^2$ is Cl. Alternatively, $Q^1$ is Br and $Q^2$ is F. Alternatively, $Q^1$ is Br and $Q^2$ is I. Alternatively, $Q^1$ is I and $Q^2$ is Cl. Alternatively, $Q^1$ is I and $Q^2$ is F. Alternatively, $Q^1$ is I and $Q^2$ is Br.

In a preferred embodiment, $Q^1$ and $Q^2$ are both F.

Residues $R^1$, $R^2$ and $R^3$ may be each independently from another any residue not comprising an azido moiety. Preferably, $R^1$, $R^2$ and $R^3$ are each independently from another selected from the group consisting of a halogen, hydrogen or an organic residue of not more than 40 carbon atoms, more preferably of not more than 30 carbon atoms, even more preferably of not more than 20 carbon atoms, in particular of not more than 10 carbon atoms.

In a preferred embodiment, $R^1$, $R^2$ and $R^3$ are each an electron withdrawing and/or water-soluble group.

Preferably, such residues $R^1$, $R^2$ and $R^3$ each bear a molecular weight of less than 1000 Da, more preferably of not more than 500 Da, in particular of not more than 250 Da or even less.

Preferably, residues $R^1$, $R^2$ and $R^3$ may be each independently from another an electron-withdrawing residue or hydrogen, more preferably at least one of $R^1$, $R^2$ and $R^3$ is a an electron-withdrawing residue, even more preferably at least two of $R^1$, $R^2$ and $R^3$ are an electron-withdrawing residues, in particular all of $R^1$, $R^2$ and $R^3$ are an electron-withdrawing residues.

In a more preferred embodiment, $R^1$, $R^2$ and $R^3$ are each independently from another selected from the group consisting of halogen, —CN, —CO—O—$R^a$, —CO—$R^a$, hydrogen, —$R^a$, —O—CO—$R^a$, —NO$_2$, —N+$R^aR^bR^a$+ $X^-$, —$R^d$—O—CO—$R^a$, —$R^d$—CO—O—$R^a$, —NR$^b$—CO—$R^a$, —$R^d$—NR$^b$—CO—$R^a$, —CO—NR$^b$—$R^a$, —$R^d$—CO—NR$^b$—$R^a$, —NR$^a$R$^b$, —$R^d$—NR$^a$R$^b$, —SiR$^a$R$^b$R$^c$, —$R^d$—SiR$^a$R$^b$R$^c$, —O—$R^a$, —$R^d$—O—$R^a$, —CO—$R^a$, —$R^d$—CO—$R^a$, —O—CO—O—$R^a$, —$R^d$—O—CO—O—$R^a$, —NR$^b$—CO—O—$R^a$, —$R^d$—NR$^b$—CO—O—$R^a$, —O—CO—NR$^b$—$R^a$, —$R^d$—O—CO—NR$^b$—$R^a$, —NR$^b$—CO—NR$^c$—$R^a$, —$R^d$—NR$^b$—CO—NR$^c$—$R^a$, —O—CS—$R^a$, —$R^d$—O—CS—$R^a$, —CS—O—$R^a$, —$R^d$—CS—O—$R^a$, —S—CO—$R^a$, —$R^d$—S—CO—$R^a$, —CO—S—$R^a$, —$R^d$—CO—S—$R^a$, —NR$^b$—CS—$R^a$, —$R^d$—NR$^b$—CS—$R^a$, —CS—NR$^b$—$R^a$, —$R^d$CS—NR$^b$—$R^a$, —S—S—$R^a$, —$R^d$—S—$R^a$, —CS—$R^a$, —$R^d$—CS—$R^a$, —O—CS—O—$R^a$, —$R^d$—O—CS—O—$R^a$, —$R^d$—CS—O—$R^a$, —S—CO—O—$R^a$, —$R^d$S—CO—O—$R^a$, —O—CO—S—$R^a$, —$R^d$—O—CO—S—$R^a$, —S—CO—S—$R^a$, —$R^d$—S—CO—S—$R^a$, —NR$^b$—CS—O—$R^a$, —NR$^b$—CO—S—$R^a$, —$R^d$—NR$^b$—CS—O—$R^a$, —$R^d$—NR$^b$—CO—S—$R^a$, —S—CO—NR$^b$—$R^a$, —O—CS—NR$^b$—$R^a$, —$R^d$—O—CS—NR$^b$—$R^a$, —$R^d$—S—CO—NR$^b$—$R^a$, —NR$^b$—CS—NR$^c$—$R^a$, —$R^d$—NR$^b$—CS—NR$^c$—$R^a$, —SO—$R^a$, —$R^d$—SO—$R^a$, —SO$_2$—$R^a$, and —$R^d$—SO$_2$—$R^a$,
wherein $R^a$, $R^b$ and $R^c$ are each independently from another selected from hydrogen, halogen, or an unsubstituted or substituted residue of not more than 20 carbon atoms selected from the group consisting of alkyl, alkenyl, alkinyl, heteroalkyl, heteroalkenyl, heteroalkinyl, aryl, alkaryl, arylalkyl, heteroaryl, heteroarylalkyl, and heteroalkaryl,
wherein $R^d$ is a bivalent residue of not more than 20 carbon atoms, preferably an unsubstituted or substituted residue selected from the group consisting of alkylene, alkenylene, alkinylene, heteroalkylene, heteroalkenylene, heteroalkinylene, arylene, alkarylene, arylalkylene, heteroarylene, heteroarylalkylene, and heteroalkarylene, and
wherein $X^-$ is a counter ion.

$X^-$ may be any anionic counter ion such as, exemplarily, $OH^-$, $Cl^-$, $HSO_3^-$, $SO_3^{2-}$, $HSO_4^-$, $SO_4^{2-}$, $NO_2^-$, $NO_3^-$, $H_2PO_4^-$, $HPO_4^{2-}$, $PO_4^{3-}$, $AsO_4^{3-}$, $HCO_3^-$, $CO_3^{2-}$, $SiO_4^{4-}$, or $BO_3^{3-}$.

In an even more preferred embodiment, $R^1$, $R^2$ and $R^3$ are each independently from another selected from the group consisting of halogen, —CN, —CO—O—$CH_3$, —CO—$CH_3$, —$CF_3$, —O—$CF_3$, —$NO_2$, —$N^+R^aR^bR^a$+$X^-$, and hydrogen, wherein $R^a$, $R^b$, $R^c$ and $X^-$ are defined as above.

In a more preferred embodiment, at least one of $R^1$, $R^2$ and $R^3$ is an electron withdrawing residue selected from the group consisting of a halogen, a cyano residue, —$CH_3CO$, a halogenated methyl residue, in particular trifluoromethyl, a halogenated ethyl residue, a halogenated or nonhalogenated methoxy residue, in particular trifluoromethoxy, PhCO.

Substitution with one or more further electron-withdrawing residues in positions $R^1$, $R^2$ and/or $R^3$ may enhance stability of the photo-active species.

In an even more preferred embodiment, at least one of $R^1$, $R^2$ and $R^3$ is a halogen.

Exemplarily, at least $R^1$ is a halogen. Exemplarily, at least $R^2$ is a halogen. Exemplarily, at least $R^3$ is a halogen. Such halogen may exemplarily be F, Cl, Br or I. Most preferably, such halogen is F.

In an even more preferred embodiment, at least one of $R^1$, $R^2$ and $R^3$ is fluorine.

In a more preferred embodiment, at least two of $R^1$, $R^2$ and $R^3$ are each independently from another a halogen.

Exemplarily, at least $R^1$ and $R^2$ are each independently from another a halogen. Exemplarily, at least $R^1$ and $R^3$ are each independently from another a halogen. Exemplarily, at least $R^2$ and $R^3$ are each independently from another a halogen. Such halogen may exemplarily be F, Cl, Br or I. Preferably, at least one of such halogens is F. Most preferably, both halogens are F.

In an even more preferred embodiment, $R^1$, $R^2$ and $R^3$ are each independently from another a halogen.

Exemplarily, of $R^1$, $R^2$ and $R^3$ are each F. Alternatively, of $R^1$, $R^2$ and $R^3$ are each Cl. Alternatively, of $R^1$, $R^2$ and $R^3$ are each Br. Alternatively, of $R^1$, $R^2$ and $R^3$ are each I. Alternatively, of $R^1$ is F, and $R^2$ and $R^3$ are each Cl. Alternatively, of $R^1$ is F, and $R^2$ and $R^3$ are each Br. Alternatively, of $R^1$ is F, and $R^2$ and $R^3$ are each I. Alternatively, of $R^1$ is Cl, and $R^2$ and $R^3$ are each F. Alternatively, of $R^1$ is Cl, and $R^2$ and $R^3$ are each Br. Alternatively, of $R^1$ is Cl, and $R^2$ and $R^3$ are each I. Alternatively, of $R^1$ is Br, and $R^2$ and $R^3$ are each F. Alternatively, of $R^1$ is Br, and $R^2$ and $R^3$ are each Cl. Alternatively, of $R^1$ is Br, and $R^2$ and $R^3$ are each I. Alternatively, of $R^1$ is I, and $R^2$ and $R^3$ are each F. Alternatively, of $R^1$ is I, and $R^2$ and $R^3$ are each Cl. Alternatively, of $R^1$ is I, and $R^2$ and $R^3$ are each Br. Alternatively, of $R^1$ and $R^2$ are each F, and $R^3$ is Cl. Alternatively, of $R^1$ and $R^2$ are each F, and $R^3$ is Br. Alternatively, of $R^1$ and $R^2$ are each F, and $R^3$ is I. Alternatively, of $R^1$ and $R^2$ are each Cl, and $R^3$ is F. Alternatively, of $R^1$ and $R^2$ are each Cl, and $R^3$ is Br. Alternatively, of $R^1$ and $R^2$ are each Cl, and $R^3$ is I. Alternatively, of $R^1$ and $R^2$ are each Br, and $R^3$ is F. Alternatively, of $R^1$ and $R^2$ are each Br, and $R^3$ is Cl. Alternatively, of $R^1$ and $R^2$ are each Br, and $R^3$ is I. Alternatively, of $R^1$ and $R^2$ are each I, and $R^3$ is F. Alternatively, of $R^1$ and $R^2$ are each I, and $R^3$ is Br. Alternatively, of $R^1$ and $R^2$ are each I, and $R^3$ is Cl. Alternatively, of $R^1$ and $R^3$ are each F, and $R^2$ is Cl. Alternatively, of $R^1$ and $R^3$ are each F, and $R^2$ is Br. Alternatively, of $R^1$ and $R^3$ are each F, and $R^2$ is I. Alternatively, of $R^1$ and $R^3$ are each Cl, and $R^2$ is F. Alternatively, of $R^1$ and $R^3$ are each Cl, and $R^2$ is Br. Alternatively, of $R^1$ and $R^3$ are each Cl, and $R^2$ is I. Alternatively, of $R^1$ and $R^3$ are each Br, and $R^2$ is F. Alternatively, of $R^1$ and $R^3$ are each Br, and $R^2$ is Cl. Alternatively, of $R^1$ and $R^3$ are each Br, and $R^2$ is I. Alternatively, of $R^1$ and $R^3$ are each I, and $R^2$ is F. Alternatively, of $R^1$ and $R^3$ are each I, and $R^2$ is Br. Alternatively, of $R^1$ and $R^3$ are each I, and $R^2$ is Cl.

In a more preferred embodiment, all of $R^1$, $R^2$ and $R^3$ are each F.

Highly, preferably, all of the residues $Q^1$, $Q^2$, $R^1$, $R^2$ and $R^3$ are each independently a halogen.

In a particularly preferred embodiment, the mono-azide compound of the formula (I) is azido pentafluorobenzene.

Polymer strands may be strands of polymers of any polymer known in the art. Preferably, a polymer strand comprises at least 5 monomer moieties, more preferably at least 10 monomer moieties, even more preferably at least 50 monomer moieties, even more preferably at least 100 monomer moieties, even more preferably at least 250 monomer, at least 500 or even more that 1000 monomer moieties covalently consecutively bound with another.

Accordingly, a polymer strand preferably has a molecular weight of at least 500 Da, more preferably of at least 1 kDa, even more preferably of at least 5 kDa, even more preferably of at least 10 kDa.

Preferably, the polymer strand bears hydrogen atoms, in particular wherein the polymer strand bears one or more benzylic hydrogen(s), allyl(s) and/or stable radical(s). Preferably, upon the use as described herein, such benzylic hydrogens (benzylic H) may undergo hydrogen abstraction, and consequently, promote the cross-linking though reticulation.

In a preferred embodiment, the polymer strands are selected from the group consisting of poly(vinylpyridine), poly(vinylbenzyl chloride), polyvinyltoluene, poly(2-vinylnaphtalene), polyvinyl chloride, polyvinyl acetate, polyvinyl alcohol, polyacrylonitrile, poly(vinylphenol), polyethylene, polypropylene, polymethylpentene, polybutadiene, polybutene-1, polyisobutylene, ethylene propylene rubber, and ethylene propylene diene monomer rubber, polyethalene oxide, polyethylene glycol methyl ester, poly(methacrylate), poly(methyl methacrylate) polycaprolactone, polylactic acid, polymalic acid, polystyrene, poly(alpha-methylstyrene), poly(benzophenone), poly(triphenyl methyl), polystyrene-co-maleic anhydrate, poly(ethylene oxide), and copolymers of two or more thereof.

Evidently, also polymer blends comprising one, two or three of the aforementioned polymers are embraced by the present invention.

More preferably, the polymer strands are selected from the group consisting of poly(vinylpyridine), poly(2-vinylnaphthalene), poly(vinylbenzyl chloride), polyvinyltoluene, poly(methyl methacrylate), and poly(ethylene oxide). Evidently, also polymer mixtures of two or more thereof are also preferably used as well as polymer blends comprising one, two or three of the aforementioned polymers.

Such copolymers may be random copolymers, block polymers or a combination of both.

The cross-linking of the polymer strands by means of the mono-azide compound structure of formula (I) may be initiated by any means known in the art. Exemplarily, it may be initiated by means of irradiating a composition comprising said mono-azide compound structure of formula (I), said polymer strands, and optionally one or more solvent(s) (photo-induced cross-linking) or by means of increasing the temperature of said composition (thermo-induced cross-linking).

In a preferred embodiment, the cross-linking is photo-induced cross-linking.

In a more preferred embodiment, the cross-linking is photo-induced cross-linking by excitation with light of a wavelength in the range of from 200 nm to 450 nm.

The wavelength may depend on the absorption maximum of the ono-azide compound structure of formula (I), in particular of the substitution of the benzene ring, in particular of residues $Q^1$ and $Q^2$.

Even more preferably, the cross-linking is photo-induced cross-linking by excitation with light of a wavelength in the range of from 200 nm to 400 nm, preferably 220 nm to 270 nm, in particular in the range of from 240 nm to 260 nm. Exemplarily, the excitation may be performed by a monochromatic UV light emitting light at a wavelength of 254 nm.

Such photo-induced cross-linking may be supported and improved by providing the composition comprising the mono-azide compound structure of formula (I) and said polymer strands and optionally one or more solvent(s) into a laminar extension of a thickness of less than 1 mm, preferably less than 100 μm, more preferably less than 10 μm, more preferably less than 1 μm, in particular less than 500 nm while being irradiated. This may be precedingly achieved by any means known for such purpose such as, exemplarily, by means of spin coating, solution casting, spraying, slot die coating and/or printing (e.g., ink-jet printing, flexo-printing, gravure printing). The intensity of the light will be adopted to the individual composition, e.g., depending on the thickness of the layer, the polymer strands to be cross-linked and the employed mono-azide compound of formula (I), the employed solvents as well as the amounts and concentration of the ingredients. For a thin layer of a thickness in the lower micrometer or in the nanometer range, the employed energy may exemplarily be in the range of from 100 mJ/cm² to 100 J/cm².

In a second aspect, the present invention relates to a method for cross-linking polymer stands, comprising the following steps:
(i) providing a composition comprising
  (A) the polymer stands,
  (B) a mono-azide compound of the formula (I):

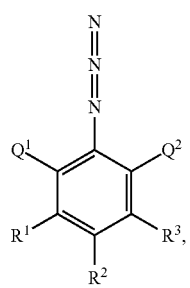

(I)

wherein $Q^1$ and $Q^2$ are each independently from another each a halogen,
  wherein $R^1$, $R^2$ and $R^3$ are each independently from another any residue not comprising an azido moiety, and
  (C) optionally one or more solvent(s);
(ii) irradiating said composition of step (i) with light of a wavelength in the range of from 200 nm to 450 nm;
(iii) optionally removing one or more solvents from the sample; and
(iv) obtaining a cross-linked polymer composition.

Herein, the mono-azide compound of the formula (I) serves as a photo-inducible agent for initiating the cross-linking of polymer strands. The definitions laid out in the context of the use of a mono-azide compound of the formula (I) for cross-linking polymer strands may also apply to the method described herein.

The step (i) of providing a composition comprising the polymer stands, a mono-azide compound of the formula (I), and optionally one or more solvent(s) may be performed by any means known in the art. Most commonly, it may be performed by means of mixing the aforementioned ingredients with another. Preferably, the polymer stands and the mono-azide compound of the formula (I) are dissolved in one or more solvent(s). Such solvent may exemplarily be an aldehyde or a ketone (e.g., pentanone (e.g., c-pentanone)). However, also other solvents may be used such as, e.g., toluene, benzene, an alkylic solvent (e.g., hexane, pentane, etc.), halogenated alkane, or mixtures of two or more solvents.

In a preferred embodiment, the mono-azide compound of the formula (I) and/or wherein the polymer strands are defined as in the context of the use above.

The step (ii) of irradiating the composition comprising the polymer stands, a mono-azide compound of the formula (I), and optionally one or more solvent(s) may be performed by any means known in the art. Preferably, by means of a light source irradiating light in the wavelength range of from 200 nm to 450 nm.

Optionally, irradiation of step (ii) may be performed under inert gas atmosphere (e.g., nitrogen ($N_2$) atmosphere or rare gas (e.g., argon) atmosphere).

Optionally, during irradiation, prior to irradiation and/or subsequent to irradiation the temperature may be kept at room temperature or may be increased (e.g., to 50-100° C.) or may be decreased. Preferably the temperature is kept at room temperature or may be increased.

The wavelength of the irradiated light may depend on the absorption maximum of the mono-azide compound structure of formula (I), in particular of the substitution of the benzene ring, in particular of residues $Q^1$ and $Q^2$. However, irradiation with light of a wavelength at 254 nm in many cases is well applicable for a wide variety of compounds of the present invention.

In a preferred embodiment, the step (ii) of irradiating is excitation with light of a wavelength in the range of from 200 nm to 400 nm, preferably 220 nm to 270 nm, in particular in the range of from 240 nm to 260 nm.

Exemplarily, the excitation may be performed by a monochromatic UV light emitting light at a wavelength of 254 nm.

Such photo-induced cross-linking may be supported and improved by providing the composition comprising the mono-azide compound structure of formula (I) and said polymer strands and optionally one or more solvent(s) into a laminar extension.

Therefore, in a preferred embodiment, prior to step (ii) of irradiating, the composition of step (i) is brought into a laminar extension of a thickness of less than 1 mm, preferably less than 100 μm, more preferably less than 10 μm, more preferably less than 1 μm, in particular less than 500 nm.

This may be achieved by any means known for such purpose.

In a preferred embodiment, the composition of step (i) is brought into a laminar extension by means of spin coating, solution casting, spraying, slot die coating and/or printing (e.g., ink-jet printing, flexo-printing, gravure printing).

The intensity of the light irradiated while performing step (ii) may be any intensity suitable for initiating the photo-induced cross-linking. For a thin layer of a thickness in the lower micrometer or in the nanometer range, the employed energy may exemplarily be in the range of 100 mJ/cm$^2$ to 100 J/cm$^2$.

In a preferred embodiment, the step (ii) of irradiating is excitation an amount of irradiation energy in the range of from 100 mJ/cm$^2$ to 100 J/cm$^2$, preferably in the range of from 500 mJ/cm$^2$ to 10 J/cm$^2$, more preferably in the range of from 750 mJ/cm$^2$ to 5000 mJ/cm$^2$, even more preferably in the range of from 1000 mJ/cm$^2$ to 3000 mJ/cm$^2$, in particular in the range of from 1500 mJ/cm$^2$ to 2000 mJ/cm$^2$.

The person skilled in the art will be able to adopt the intensity of the light irradiated while performing step (ii) to the individual composition, e.g., depending on the thickness of the layer, the polymer strands to be cross-linked and the employed mono-azide compound of formula (I), the employed solvents as well as the amounts and concentration of the ingredients.

The optional step (iii) of removing one or more solvent(s) from the sample may be performed by any means known in the art. Exemplarily, the one or more solvent(s) may be removed by evaporating the solvent(s) at room temperature at normal pressure. Optionally, this process may be accelerated by employing higher temperatures and/or lower pressures. Alternatively or additionally, the solvent may be removed by subjecting the cross-linked layer to a gas flow (e.g. an air stream). Alternatively or additionally, the solvent may be removed by washing it out by means of another solvent, e.g., a solvent evaporating faster and/or to a higher degree. Such washing with solvent (the same solvent used in the composition of step (i) or another solvent the polymer strands are soluble in) may also be used for removing residual mono-azide compound of the formula (I), reaction products thereof and/or polymer strands cross-linked to a low degree or non-cross-linked.

In a preferred embodiment, the method further comprises the step (v) of removing:
residual mono-azide compound of the formula (I);
reaction products of the mono-azide compound of the formula (I); and/or
polymer strands cross-linked to a low degree or non-cross-linked.

Removal according step (v) may exemplarily be performed by washing the cross-linked polymer composition obtained from the above-described method with one or more solvent(s). Such one or more solvent(s) may be such used in step (i) of the method or may be other solvent(s).

Polymer strands cross-linked to a low degree bear less covalent cross-linkages than the corresponding polymer strands where effective cross-linkage occurs. Non-cross-linked polymer strands bear (essentially) no covalent cross-linkages at all. Exemplarily, non-cross-linked polymer strands may be found in (essentially) non-irradiated sections of the composition of step (i). Polymer strands cross-linked to a low degree may be found in (essentially) non-irradiated or less irradiated sections of the composition of step (i).

Therefore, before step (ii) is performed, all polymer strands are non-cross-linked. After step (ii) has been performed, the irradiated sections of the composition of step (i) are cross-linked, the not or less irradiated sections may however remain non- or less-cross-linked. Exemplarily, the ratio of cross-linkages of (cross-linked polymer strands):(polymer strands cross-linked to a low degree) may preferably at least 1.5:1, more preferably at least 2:1, even more preferably at least 5:1, even more preferably at least 10:1, even more preferably at least 20:1, even more preferably at least 50:1, in particular at least 100:1 or even higher.

Such selective removal of the non- or less-cross-linked polymer strands enables structuring of a part of the device. As used herein, term "structuring" may be understood interchangeably with the term "patterning" in the broadest sense as the generation of any patterned structure. Exemplarily, particular spatial areas of the part of the device may be masked from being irradiated.

Accordingly, then, prior to step (ii), the composition comprising the mono-azide compound structure of formula (I) and said polymer strands and optionally one or more solvent(s) obtained from step (i) is partly masked. Herein, preferably, such composition of step (i) is brought into a laminar structure and then partly covered by either a solid or a liquid material (photo mask) preventing the irradiation light of step (ii) to irradiate the covered part of the laminar structure of said composition.

Alternatively or additionally, irradiation of step (ii) may be spatially selective irradiation such as, e.g., irradiation via a light beam rasterizing the laminar structure of composition of step (i).

The cross-linked polymer composition obtainable from the method described herein may have particular beneficial features.

Therefore a further aspect of the present invention relates to a cross-linked polymer composition obtainable from the method of the present invention.

Furthermore, a still further aspect of the present invention refers to an electronic device comprising the cross-linked polymer composition according to the present invention.

Preferably, the cross-linked polymer composition represents a layer.

In a preferred embodiment, the cross-linked polymer composition represents a dielectric layer, a resist layer, an insulating layer, a passivation layer, a planarization layer, an encapsulation layer or a coating.

Particularly preferably, the cross-linked polymer composition represents a dielectric material.

Such dielectric materials may be applied in many electronic devices such as, e.g., field effect transistors (FETs).

Therefore, the present invention also relates to the cross-linked polymer composition for forming a dielectric layer, a resist layer, an insulating layer, a passivation layer, a planarization layer, an encapsulation layer and/or a coating.

In a particularly preferred embodiment, such cross-linked polymer composition represents a dielectric layer in said electronic device.

Such electronic device may be any electronic device known in the art such as, e.g., field effect transistors (FETs), diodes, solar cells, transistors, multipliers, integrated optical circuit (IOC) elements, resistors, conductive camera tubes, charge-coupled (imaging) devices, injection laser diodes or quantum cascade lasers. Exemplarily, the electronic device is an organic field effect transistor (FET) and the layer is the dielectric layer. Field effect transistors (FETs) can be used in applications that require electronic functionalities such as, e.g., displays, large-area sensors and radio-frequency identification (RFID) tags.

The present invention also relates to a cross-linked polymer composition (in particular such cross-lined by the method of the present invention) and to electronic devices comprising a layer formed from such compositions. Preferably, the electronic device is an organic field effect transistor and the layer is the dielectric layer.

Dielectric materials can be applied in many electronic devices such as field effect transistors (FETs). Field effect transistors (FETs) can be used in applications that require electronic functionalities such as displays, large-area sensors and radio-frequency identification (RFID) tags.

The following figures and examples are intended to illustrate the present invention further, but not to limit the scope thereof.

FIGURES

EXAMPLES

Example 1

Synthesis of Azido pentafluorobenzene (PFPA):

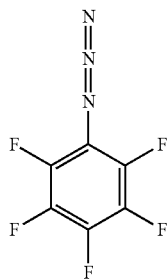

Figure 1:
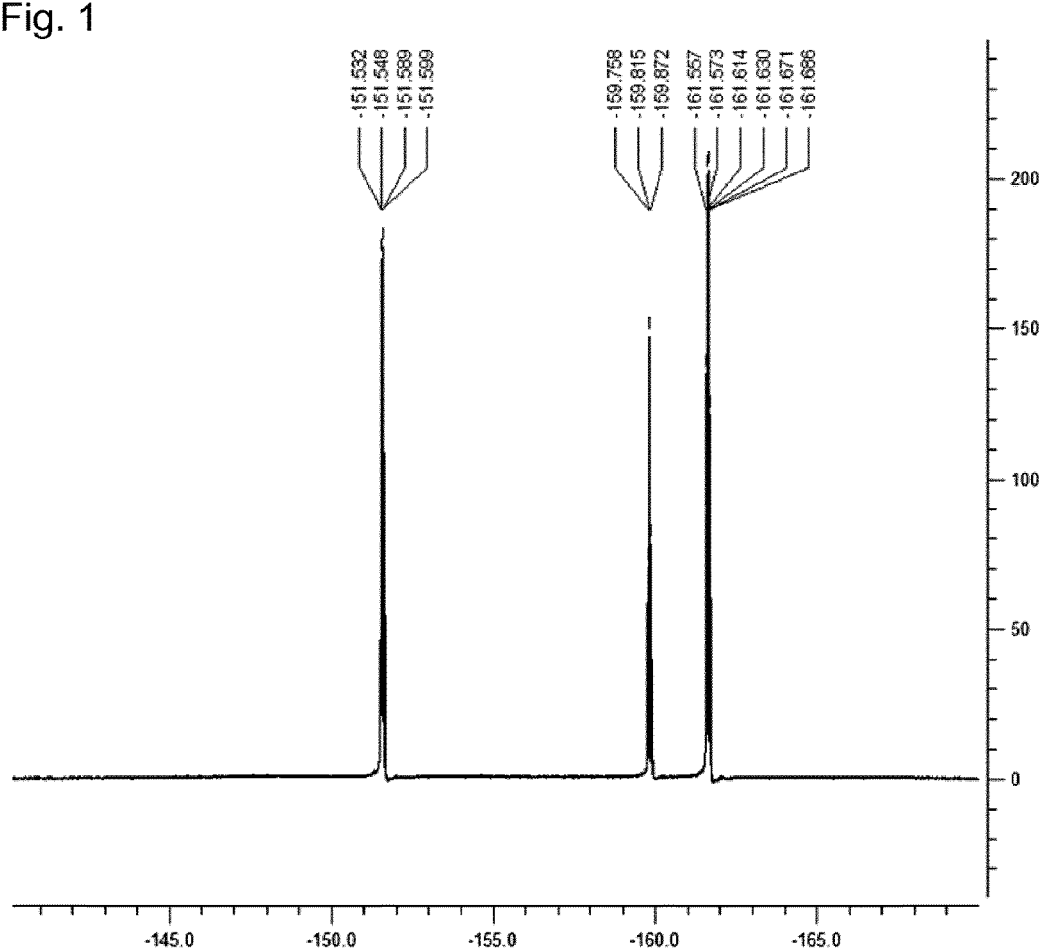
FIG. 1 shows an $^{19}$F-NMR of the azido pentafluorobenzene (PFPA): main peaks are located at −151.6 ppm, −159.8 ppm, and −161.6 ppm at signal intensities 2:1:2. Herein, the following parameters were set: frequency (MHz): (f1) 375.638, original points count: (f1) 131072, acquisition time (sec): (f1) 1.0000, spectral width (ppm): (f1) 207.980, temperature: 25°, number of scans: 16.

In a 250 mL three-neck round bottom flask equipped with thermometer, magnetic stirrer bar and cooling bath, 2,3,4,5,6-pentafluoroaniline (4.2 g, 23.1 mmol) was dissolved in trifluoroacetic acid (50 mL) at −10° C. Sodium nitrite (3.15 g, 45 mmol) was added slowly in small portions and the mixture was stirred for 2 h, while keeping the temperature constant. Then sodium azide (3.15 g, 48 mmol) was added to the solution within 10 min and the solution was stirred for 1 h. Subsequently, water (100 mL) was poured into the reaction mixture, which was allowed to warm to room temperature. The product was obtained by extraction with n-hexane (3×50 mL). The combined organic phases were washed with sodium bicarbonate (saturated solution) in order to neutralize the remaining trifluoroacetic acid. Subsequently, the solution was washed with water (50 mL) and dried over sodium sulfate. After evaporation of the solvent (rotary evaporator), 1-azido-2,3,4,5,6-pentafluorobenzene was obtained as a dark red to brown oil, pure by $^{19}$F-NMR (3.54 g, 16.9 mmol, 73%). (TLC in DCM/hexanes 1:1 shows $R_f$ of product: 0.75, $R_f$ of starting material: 0.55). A respective $^{19}$F-NMR spectrum is depicted in FIG. 1 herein. A suitable synthesis for obtaining PFPA is also depicted in U.S. Pat. No. 3,238,230.

Example 2

Formulation of PFPA and Poly(vinylpyridine) (PVPyr)

Poly-4-vinylpyridine (Mn=60,000, 2.60 g) was dissolved in c-pentanone (36.0 mL) to give a slightly yellow solution with a concentration of c=72.2 mg/mL=1.20·10$^{-6}$ mol/mL=1.2 mM. The polymer solution was split into samples of 4 mL each and treated with neat PFPA as follows. After stirring for 60 sec, homogenous solutions of the PVPyr/PFPA were obtained:

TABLE 1

Representative example for the preparation of PVPyr/PFPA solutions (I).

| sample type | amount of mono-azide (PFPA) $V_{sol.}$ [μL] | $C_{PVPyr, final}$ [mg/mL] |
|---|---|---|
| neat PVPyr | 0 | 72.2 |
| 10 mol-% PFPA (0.04 wt-%) | 20 | 71.8 |
| 30 mol-% PFPA (0.12 wt-%) | 60 | 71.1 |
| 50 mol-% PFPA (0.18 wt-%) | 100 | 70.4 |
| 100 mol-% PFPA (0.36 wt-%) | 200 | 68.8 |

To further improve film thicknesses (c. p. below) and reproducibility, PVPyr/PFPA solutions with a constant polymer concentration were prepared by mixing varying amounts of PFPA with a polymer stock solution of c $C_{PVPyr}$=90.0 mg/mL=1.50·10$^{-6}$ mol/mL=1.5 mM as follows:

TABLE 2

Representative example for the preparation of PVPyr/PFPA solutions (II).

| Sample type | amount of mono-azide (PFPA) $m_{PFPA}$ [mg] | amount of PVPyr solution $C_{PVPyr}$ = 90 mg/mL |
|---|---|---|
| 100 mol-% PFPA (0.36 wt-%) | 5 | 15.4 |
| 1000 mol-% PFPA (3.60 wt-%) | 20 | 6.2 |
| 3000 mol-% PFPA (11.3 wt-%) | 60 | 6.2 |
| 6000 mol-% PFPA (21.6 wt-%) | 120 | 6.2 |

Example 3

Preparation and Characterization of the Thin Film Samples

All preparation steps were conducted under ambient air. Si/SiO$_2$ wafer samples (2×2 cm) and ITO samples (2×2 in) were cleaned by immersing them in isopropanol and acetone and subsequent blow-drying in a N$_2$ stream (55 psi). The procedure was repeated three times before drying the substrates at 90° C. for 5 min. The obtained solutions were spin coated at 1500 rpm, (255 asc, 22° C.) for 30 sec onto the cleaned Si/SiO$_2$ wafer and ITO samples, respectively. 150 μL of polymer solution was used for the Si/SiO$_2$ wafer sample, 200 μL for the ITO samples. After drying at 90° C. for 30 sec, smooth, transparent and hard films were obtained.

Photocuring was done using a 254 nm monochromatic UV lamp at a constant output of 2.97 mW/cm$^2$ for 10 min, equaling an energy input of 1,785 mJ/cm². Film thicknesses were obtained using a profile meter device. The rinsing tests were performed by immersing the samples in c-pentanone for 60 sec, followed by blow-drying in a $N_2$ stream (55 psi) and further drying the substrates at 90° C. for 5 min. The retention factor was determined by comparison of the measured film thicknesses prior to and after the rinsing step. For each PFPA loading, at least two identical samples were prepared and characterized. A representative example is given as follows:

TABLE 3

Comparison of films before and after rinsing

| sample: 100 mol-% PFPA (0.36 wt-%) | film thicknesses [nm] measurement no. | | | | |
|---|---|---|---|---|---|
| $C_{PVPyr}$ = 68.8 mg/mL | 1 | 2 | 3 | avg. | retention factor |
| before rinsing | | | | | |
| A | 313 | 317 | 310 | 313 | |
| B | 303 | 306 | 314 | 308 | |
| after rinsing | | | | | |
| A | 292 | 295 | 299 | 295 | 94% |
| B | 292 | 286 | 294 | 291 | 94% |

Figure 2:
FIG. 2 shows a representative example of the cured PVPyr/PFPA film on Si/SiO$_2$ prior to rinsing.
Figure 3:
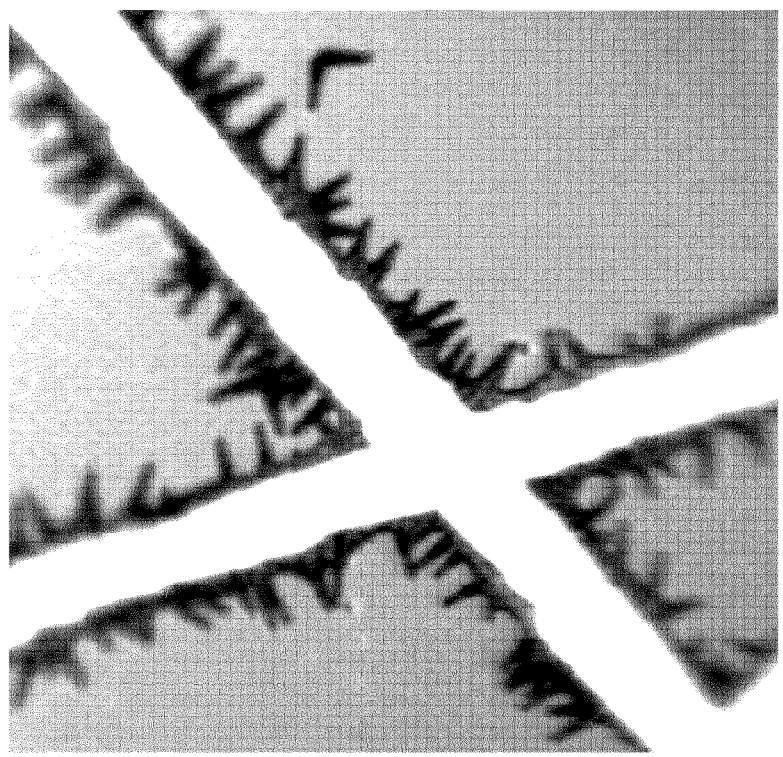
FIG. 3 shows a representative example of the cured PVPyr/PFPA film on Si/SiO$_2$ after the rinsing test.

An exemplary microscopic image of the PVPyr/PFPA film on the Si/SiO₂ wafer before rinsing is depicted in FIG. 2 herein. An exemplary microscopic image of the PVPyr/PFPA film on the Si/SiO₂ wafer after rinsing is depicted in FIG. 3 herein.

Example 4

Determination of k-Values and Device Characteristics

Figure 4:
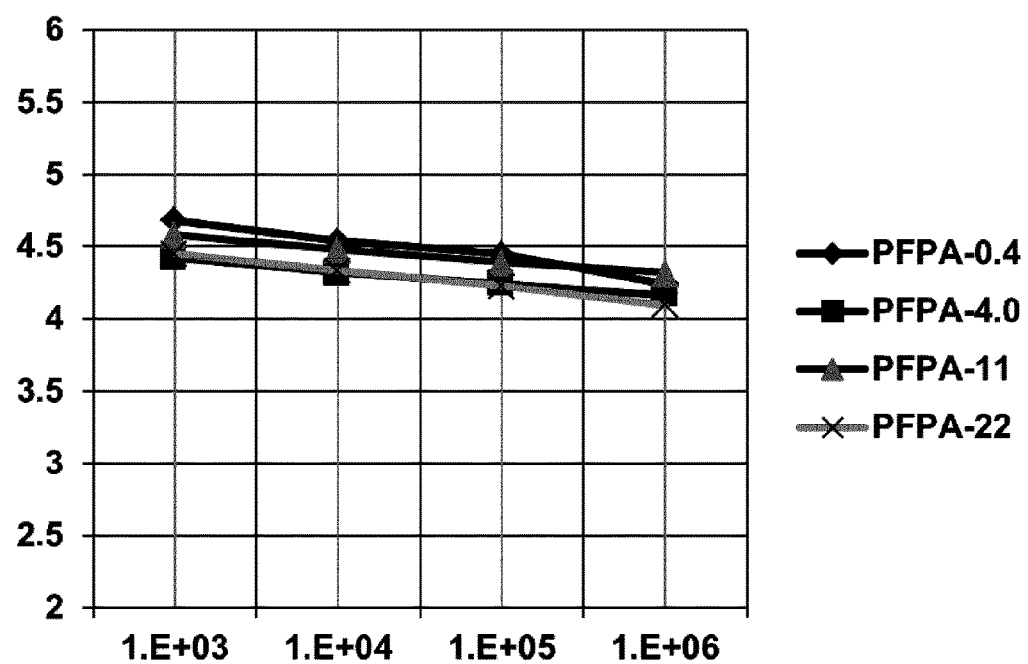
FIG. 4 shows a diagram of k over frequency for cured PVPyr/PFPA films on ITO. The indexes give the content of PFPA (wt-%).

Dielectric constants were obtained by capacitance measurements on the spin-coated ITO substrates. Evaporated Au (d≈70 nm) dots with an area of 7.85×10⁻⁷ m² were used as counter electrodes. Five datapoints were recorded for every substrate, and two substrates were characterized for every of the abovementioned PFPA concentrations. Film thicknesses were optimized to be at least 500 nm by using a polymer concentration of 90.0 mg/mL (cp. above). FIG. 4 and Table 4 show the representative k-values for PVPyr/PFPA films in a frequency range from 1 kHz to 1 MHz.

TABLE 4 k over frequency for cured PVPyr/PFPA films on ITO.

| | k over frequency | | | | |
|---|---|---|---|---|---|
| sample | 1 kHz | 10 kHz | 100 kHz | 1 MHz | avg. |
| PFPA-0.4 | 4.68 | 4.54 | 4.45 | 4.24 | 4.48 |
| PFPA-4.0 | 4.42 | 4.32 | 4.24 | 4.16 | 4.29 |
| PFPA-11 | 4.58 | 4.48 | 4.39 | 4.32 | 4.44 |
| PFPA-22 | 4.45 | 4.33 | 4.23 | 4.09 | 4.28 |

Representative data for the determination of k-values for a sample containing 100 mol-% PFPA (0.36 wt-%) is given herein.

TABLE 5

Data for the determination of k-values for two samples each containing 100 mol-% PFPA.

SAMPLE 1
Dielectric: PVPyr-PFPA
Area (m²) 7.85E−07
Thickness (nm) 572
ε0 8.85E−12

| f (Hz) | $C_{Point\ 1}$ (pF) | $C_{Point\ 2}$ (pF) | $C_{Point\ 3}$ (pF) | $C_{Point\ 4}$ (pF) | $C_{Point\ 5}$ (pF) | Average (pF) | ε |
|---|---|---|---|---|---|---|---|
| 20 | 39.5 | 19.1 | 39.7 | 38.9 | 39.0 | 35.2 | 2.90 |
| 40 | 57.4 | 58.3 | 57.6 | 56.7 | 58.3 | 57.7 | 4.75 |
| 120 | 64.4 | 65.4 | 64.9 | 63.7 | 64.8 | 64.6 | 5.32 |
| 350 | 57.6 | 57.2 | 57.8 | 56.7 | 57.9 | 57.4 | 4.73 |
| 1000 | 59.9 | 56.9 | 57.2 | 56.2 | 57.2 | 57.5 | 4.73 |
| 4000 | 56.2 | 56.3 | 56.4 | 55.4 | 56.4 | 56.1 | 4.62 |
| 10000 | 55.7 | 55.7 | 55.9 | 54.9 | 55.9 | 55.6 | 4.58 |
| 100000 | 54.7 | 54.6 | 54.7 | 53.9 | 54.8 | 54.5 | 4.49 |
| 1000000 | 53.9 | 52.0 | 52.4 | 51.2 | 52.7 | 52.4 | 4.32 |

| f (Hz) | D1 | D2 | D3 | D4 | D5 | Mean Dissipation factor |
|---|---|---|---|---|---|---|
| 20 | 4.73E−01 | 1.02E+02 | 4.46E−01 | 4.87E−01 | 4.68E−01 | 2.08E+01 |
| 40 | 4.60E−02 | 1.63E+01 | 5.11E−02 | 4.80E−02 | 4.70E−02 | 3.30E+00 |
| 120 | 4.40E−02 | 5.17E+00 | 4.70E−02 | 4.30E−02 | 4.70E−02 | 1.07E+00 |
| 350 | 1.20E−02 | 2.06E+00 | 1.60E−02 | 1.50E−02 | 1.30E−02 | 4.23E−01 |
| 1000 | 1.50E−02 | 7.39E−01 | 1.70E−02 | 1.70E−02 | 1.70E−02 | 1.61E−01 |
| 4000 | 1.40E−02 | 2.12E−02 | 1.60E−02 | 1.50E−02 | 1.60E−02 | 1.64E−02 |
| 10000 | 1.40E−02 | 9.70E−02 | 1.70E−02 | 1.60E−02 | 1.60E−02 | 3.20E−02 |
| 100000 | 1.80E−02 | 4.00E−02 | 3.70E−02 | 3.10E−02 | 2.90E−02 | 3.10E−02 |
| 1000000 | 5.60E−02 | 1.95E−01 | 1.79E−01 | 1.80E−01 | 1.62E−01 | 1.54E−01 |

TABLE 5-continued

Data for the determination of k-values for two samples each containing 100 mol-% PFPA.

SAMPLE 2
Dielectric: PVPyr-PFPA
Area (m$^2$) 7.85E−07
Thickness (nm) 577
ε0 8.85E−12

| f (Hz) | $C_{Point\ 1}$ (pF) | $C_{Point\ 2}$ (pF) | $C_{Point\ 3}$ (pF) | $C_{Point\ 4}$ (pF) | $C_{Point\ 5}$ (pF) | Average (pF) | ε |
|---|---|---|---|---|---|---|---|
| 20 | 39.8 | 38.6 | 39.0 | 37.6 | 37.6 | 38.5 | 3.197635 |
| 40 | 57.4 | 56.1 | 56.5 | 56.0 | 55.7 | 56.3 | 4.676915 |
| 120 | 63.8 | 62.5 | 62.9 | 62.5 | 62.6 | 62.9 | 5.218156 |
| 350 | 56.8 | 55.6 | 55.7 | 55.4 | 55.6 | 55.8 | 4.633749 |
| 1000 | 56.2 | 54.9 | 55.1 | 54.7 | 54.9 | 55.2 | 4.578961 |
| 4000 | 55.4 | 54.0 | 54.3 | 54.0 | 54.1 | 54.4 | 4.512551 |
| 10000 | 54.9 | 53.6 | 53.8 | 53.5 | 53.6 | 53.9 | 4.472705 |
| 100000 | 53.8 | 52.5 | 52.8 | 52.4 | 52.3 | 52.8 | 4.379731 |
| 1000000 | 52.5 | 51.8 | 51.8 | 50.3 | 40.2 | 49.3 | 4.094169 |

| f (Hz) | D1 | D2 | D3 | D4 | D5 | Mean Dissipation factor |
|---|---|---|---|---|---|---|
| 20 | 4.73E−01 | 1.02E+02 | 4.46E−01 | 4.87E−01 | 4.68E−01 | 2.08E+01 |
| 40 | 4.60E−02 | 1.63E+01 | 5.11E−02 | 4.80E−02 | 4.70E−02 | 3.30E+00 |
| 120 | 4.40E−02 | 5.17E+00 | 4.70E−02 | 4.30E−02 | 4.70E−02 | 1.07E+00 |
| 350 | 1.20E−02 | 2.06E+00 | 1.60E−02 | 1.50E−02 | 1.30E−02 | 4.23E−01 |
| 1000 | 1.50E−02 | 7.39E−01 | 1.70E−02 | 1.70E−02 | 1.70E−02 | 1.61E−01 |
| 4000 | 1.40E−02 | 2.12E−02 | 1.60E−02 | 1.50E−02 | 1.60E−02 | 1.64E−02 |
| 10000 | 1.40E−02 | 9.70E−02 | 1.70E−02 | 1.60E−02 | 1.60E−02 | 3.20E−02 |
| 100000 | 1.80E−02 | 4.00E−02 | 3.70E−02 | 3.10E−02 | 2.90E−02 | 3.10E−02 |
| 1000000 | 5.60E−02 | 1.95E−01 | 1.79E−01 | 1.80E−01 | 1.62E−01 | 1.54E−01 |

TABLE 6

Summary of the results.

| | Dielectric Constant | | | | | Dissipation Factor | | | | |
|---|---|---|---|---|---|---|---|---|---|---|
| f (Hz) | S1 | S2 | S3 | mean | error | S1 | S2 | S3 | mean | error |
| 20 | 2.90 | 3.20 | 2.90 | 3.00 | 0.17 | 20.755 | 20.755 | 20.755 | 20.755 | 0.000 |
| 40 | 4.75 | 4.68 | 4.75 | 4.72 | 0.04 | 3.298 | 3.298 | 3.298 | 3.298 | 0.000 |
| 120 | 5.32 | 5.22 | 5.32 | 5.29 | 0.06 | 1.070 | 1.070 | 1.070 | 1.070 | 0.000 |
| 350 | 4.73 | 4.63 | 4.73 | 4.70 | 0.05 | 0.423 | 0.423 | 0.423 | 0.423 | 0.000 |
| 1000 | 4.73 | 4.58 | 4.73 | 4.68 | 0.09 | 0.161 | 0.161 | 0.161 | 0.161 | 0.000 |
| 4000 | 4.62 | 4.51 | 4.62 | 4.58 | 0.06 | 0.016 | 0.016 | 0.016 | 0.016 | 0.000 |
| 10000 | 4.58 | 4.47 | 4.58 | 4.54 | 0.06 | 0.032 | 0.032 | 0.032 | 0.032 | 0.000 |
| 100000 | 4.49 | 4.38 | 4.49 | 4.45 | 0.06 | 0.031 | 0.031 | 0.031 | 0.031 | 0.000 |
| 1000000 | 4.32 | 4.09 | 4.32 | 4.24 | 0.13 | 0.154 | 0.154 | 0.154 | 0.154 | 0.000 |

Example 5

Fabrication of the Bottom-Gate-Top-Contact OFET Devices

All preparation steps were conducted under ambient air. Si/SiO$_2$ wafer samples (1×1 cm) were cleaned by immersing them in isopropanol and acetone and subsequent blow-drying in a N$_2$ stream (55 psi). The procedure was repeated three times before drying the substrates at 90° C. for 5 min. The obtained solutions were spin coated at 1500 rpm, (255 asc, 22° C.) for 30 sec onto the cleaned Si/SiO$_2$ wafer samples. After drying at 90° C. for 30 sec, smooth, transparent and hard films were obtained. Photocuring was done using a 254 nm monochromatic UV lamp at a constant output of 2.97 mW/cm$^2$ for 10 min, equaling an energy input of 1,785 mJ/cm$^2$. Afterwards, the samples were immersed in c-pentanone for 60 sec, followed by blow-drying in a N$_2$ stream (55 psi) and further drying the substrates at 90° C. for 5 min. The P1100 polymeric semiconductor (0.75 wt-% in o-xylene) was spin-coated on top of the dielectric at 1000 rpm (255 asc, 22° C.) for 30 sec, followed by drying at 90° C. for 30 sec. Evaporated Au (d≈70 nm) was used as source and drain electrodes. Characterization was performed using a typical three electrode setup. Table 7 gives an overview of the obtained figures of merit for a representative BGTC device.

TABLE 7

Merit for a representative BGTC device (W/L = 50, Id = −30 V).

| | |
|---|---|
| μ [cm$^2$/Vsec] | 2.5 × 10$^{-1}$ |
| $I_{ON/OFF}$ [A] | 6.6 × 10$^3$ |
| $I_{leak}$ [A] | 7.2 × 10$^{-9}$ |

Figure 5A:
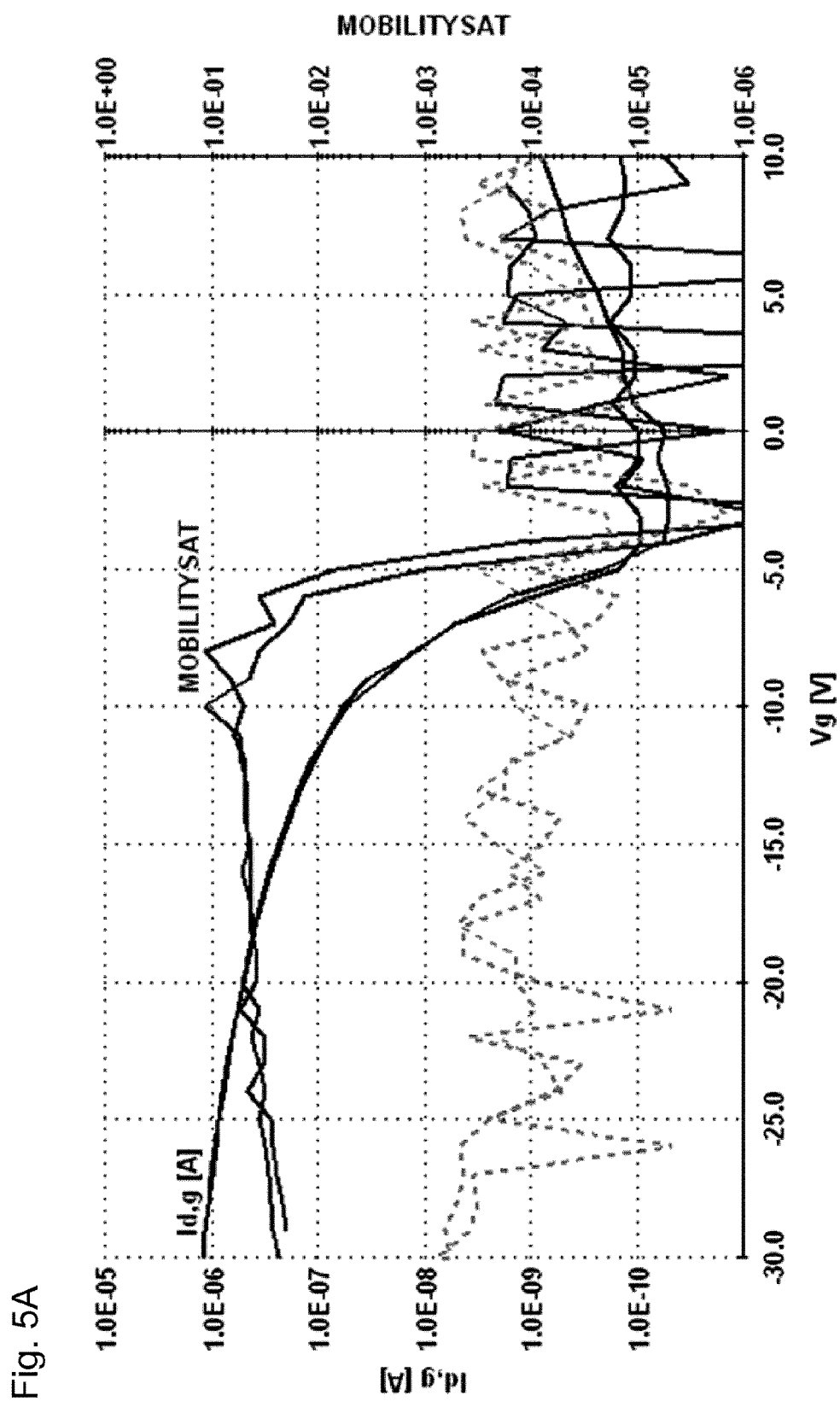
FIG. 5 shows a representative example of output (FIG. 5B) and transfer curves (FIG. 5A) for a BGTC device using a cured PVPyr/PFPA dielectric at $V_d$=−30 V (W/L=50).
Figure 5B:
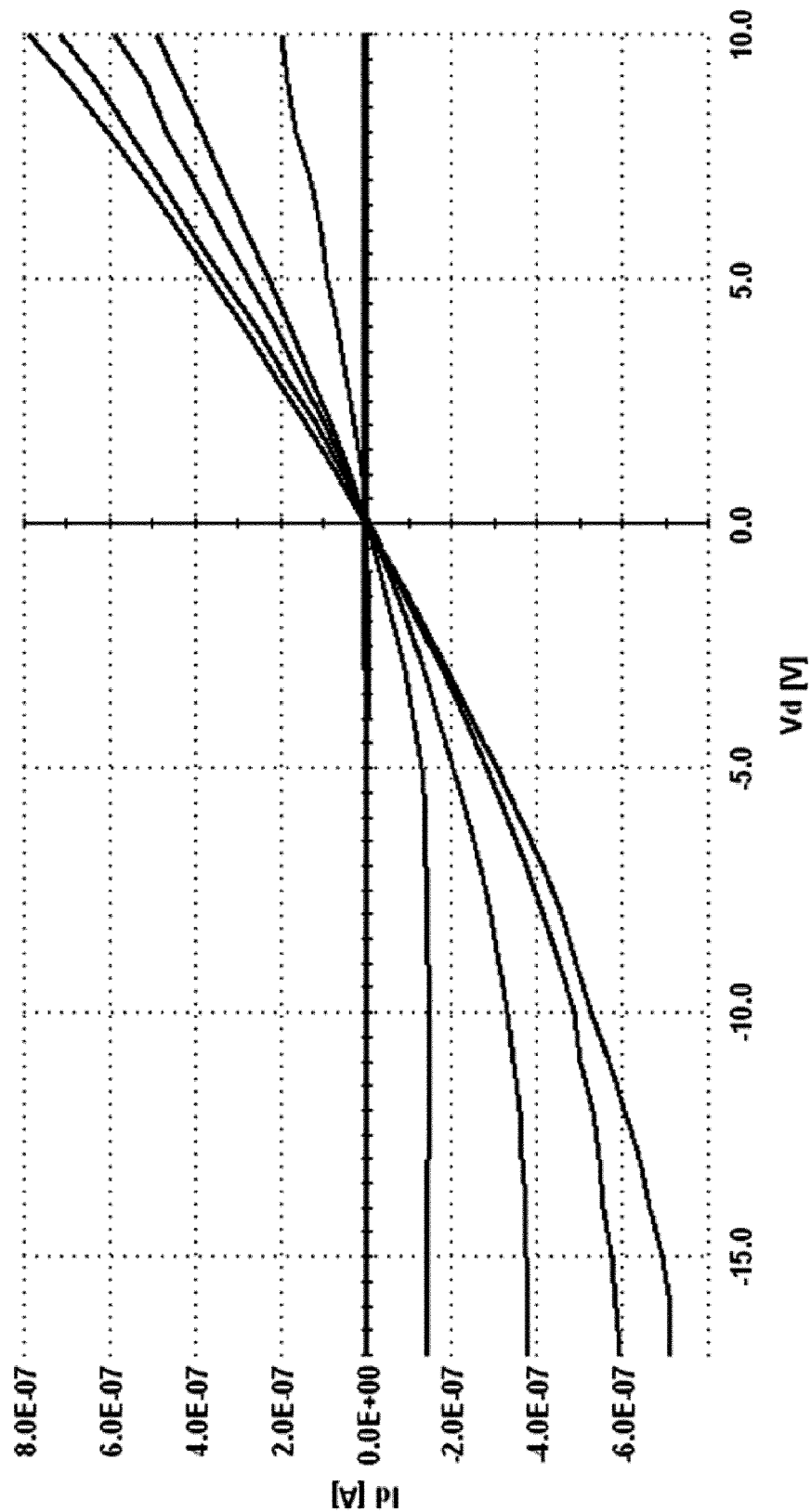

These results are further depicted in FIG. 5 herein.

Example 6

Comparison of the Cross-Linking of a Varienty of Polymers

The following (co)polymers were tested for their ability to be cross-linked by PFPA:
poly(vinylpyridine) (PVPyr), $M_w$=60 k;
poly(2-vinylnaphthalene) (PVN), $M_w$=175 k;
poly(vinylbenzyl chloride) (PVBC), $M_w$=40.5 k;
polyvinyltoluene (PVT), $M_w$=72 k;
poly(alpha-methylstyrene) (PαMS), $M_n$=1,300;
polycaprolactone (PCL), $M_n$=45 k;
poly(vinylphenol)/poly(methyl methacrylate) copolymer (PVP/PMMA);
polystyrene-co-maleic anhydrate copolymer (PS/MA);
polybutadiene (PBD), $M_w$=20 k;
poly(methyl methacrylate) (PMMA), $M_w$=996 k;
polyethylene glycol methyl ether 5,000 (PEGME); and
poly(ethylene oxide) (PEO), $M_v$=300 k.

Samples of these polymers were dissolved in a solvent. Then, 4% (w/w) PFPA were added to such solutions. The solutions were irradiated for 10 min at 254 nm by means of a monochromatic UV lamp at a constant output of 2.97 mW/cm². Subsequently, the formed immersions were maintained in the original solvent for 1 min and the retention was determined via filtration. The results are depicted below:

TABLE 8

Comparative results og the cross-linking of a varienty of polymers

| polymer | Solvent | c [mg/mL] | $d_{cured}$ [nm] | $d_{rinsed}$ [nm] | retention [%] |
|---|---|---|---|---|---|
| PVPyr | c-pentanone | 70 | 303, 306, 314, (±2) | 292, 286, 294 (±2) | 93-97% |
| PVPyr | c-pentanone | 90 | 736, 733, 731 (±1) | 733, 728, 719 (±2) | 98-100% |
| PVN | c-pentanone | 70 | 450, 426, 406 (±1) | 332, 266, 246 (±2) | 61-74% |
| PVBC | c-pentanone | 90 | 875, 568, 389 (±1) | 686, 453, 386 (±1) | 77-78% |
| PVT | c-pentanone | 90 | 1054, 1000, 958 (±2) | 866, 858, 835 (±2) | 82-87% |
| PαMS | c-pentanone | 90 | 629, 574, 532 (±2) | NO RETENTION | |
| PCL | c-pentanone | 90 | 940, 870, 735 (±2) | NO RETENTION | |
| PVP/PMMA | c-pentanone | 90 | 658, 644, 633 (±2) | NO RETENTION | |
| PS/MA | c-pentanone | 90 | 693, 688, 685 (±1) | NO RETENTION | |
| PBD | c-pentanone | 90 | N/A (no solid film formed, resinous polymer) | | |
| PMMA | c-pentanone | 45 | 234, 225, 220 (±2) | NO RETENTION | |
| PMMA | NMP | 45 | 535, 515, 500 (±2) | 477, 440, 422 (±5) | 85-89% |
| PEGME | NMP | 90 | N/A (no film formed, low viscosity) | | |
| PEO | NMP | <30 (sat.)** | 99, 68, 57 | 104, 82, 54 | 79-82% |

This experiment provides evidence that a large variety of polymers show significant retention upon cross-linking initialized by the compound of the present invention. As the reaction conditions were so far not finally optimized, also the polymers showing no significant retention herein may be cross-linked by means of a compound of the present invention to a certain degree upon modifying the reaction conditions.

REFERENCES

EP 0 019 726
US 2009/0004402
U.S. Pat. No. 3,238,230
WO 2011/068482
A. Reiser, L. J. Leyshon and L. Johnston; Effect of matrix rigidity on the reactions of aromatic nitrenes in polymers; Trans. Faraday Soc., 1971, 67:2389-2396.
G. A. Delzenne; Photographic applications of photopolymers: Photophysical and photochemical aspects; Ind. Chim. Belg., 1974, 39:249-265.
J. L. R. Williams; Photoreactive Polymers; in Polyelectrolytes, 1974, pages 507-528.
J. J. Cottart, C. Loucheux and A. Lablache-Combier; Photochemistry of polymeric systems. IV. Photocrosslinking of copolymers including pyridinium dicyanomethylide groups; Journal of Applied Polymer Science, 1981, 26(4): 1233-1241.
T. Iwayanagi, M. Hashimoto and S. Nonogaki; Azide-Phenolic Resin UV Resist (MRL) for Microlithography; Polymer Engineering and Science, 1983, 23(17):935-940.
M. Hashimoto, T. Iwayanagi and H. Shiraishi; Photochemistry of Azide-Phenolic Resin Photoresists; Polymer Engineering and Science, 1986, 26(16):1090-1095.
S. Nonogaki; High-Resolution negative Photoresists Composed of Phenolic Resin and Aromatic Azide, Polymer Journal, 1987, 19(1):99-104.
C. C. Han and J. C. Corelli; Mechanism study of deep-UV irradiated poly(methyl methacrylate)azide resist system; in radiation Effects and Defects in Solids: Incorporating Plasma Science and Plasma Technology; 1989, 111(112): 45-58.
M. Yan, S. X. Cai, M. N. Wybourne, J. F. W. Keana; N-Hydroxysuccinimide Ester Functionalized Perfluorophenyl Azides as Novel Photoactive Heterobifunctional Crosslinking Reagents. The Covalent Immobilization of Biomolecules to Polymer Surfaces; Bioconjugate Chem., 1994, 5(2):151-157

The invention claimed is:

1. A method for cross-linking polymer strands, the method comprising:
   (i) providing a composition comprising
      (A) the polymer strands,
      (B) a mono-azide mono-functional compound of the formula (I):

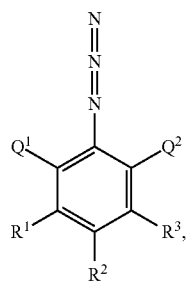

wherein:
   $Q^1$ and $Q^2$ are each independently from another each a halogen, and
   $R^1$, $R^2$ and $R^3$ are each independently from another any residue not comprising an azido moiety, and wherein $R^1$, $R^2$, and $R^3$ are each independently selected from the group consisting of halogen, —CN, —CO—O—$CH_3$, —CO—$CH_3$, —$CF_3$, —O—$CF_3$, $CF_3$, —$NO_2$ and hydrogen, and
      (C) optionally one or more solvent(s);
   (ii) irradiating said composition of step (i) with light of a wavelength in the range of from 200 nm to 450 nm;
   (iii) optionally removing one or more solvents from the sample; and
   (iv) obtaining a cross-linked polymer composition.

2. The method according to claim 1, wherein $Q^1$ and $Q^2$ are both F.

3. The method according to claim 1, wherein at least two of $R^1$, $R^2$ and $R^3$ are each independently from another a halogen.

4. The method according to claim 1, wherein the polymer strands are selected from the group consisting of poly (vinylpyridine), poly(vinylbenzyl chloride), polyvinyltoluene, poly(2-vinylnaphtalene), polyvinyl chloride, polyvinyl acetate, polyvinyl alcohol, polyacrylonitrile, poly(vinylphenol), polyethylene, polypropylene, polymethylpentene, polybutadiene, polybutene-1, polyisobutylene, ethylene propylene rubber, and ethylene propylene diene monomer rubber, polyethylene oxide, polyethylene glycol methyl ester, poly(methacrylate), poly(methyl methacrylate) polycaprolactone, polylactic acid, polymalic acid, polystyrene, poly (alpha-methylstyrene), polystyrene-co-maleic anhydrate, poly(ethylene oxide), and copolymers of two or more thereof.

5. The method according to claim 1, wherein the step (ii) of irradiating is excitation with light of a wavelength in the range of from 200 nm to 400 nm.

6. The method according to claim 1, wherein prior to step (ii) of irradiating, the composition of step (i) is brought into a laminar extension of a thickness of less than 1 mm.

7. The method according to claim 6, wherein the composition of step (i) is brought into a laminar extension by means of spin coating, solution casting, spraying, slot die coating and/or printing.

8. The method according to claim 1, wherein the step (ii) of irradiating is excitation an amount of irradiation energy in the range of from 100 $mJ/cm^2$ to 100 $J/cm^2$.

9. The method according to claim 1, wherein said method further comprises:
   (v) removing:
      residual mono-azide compound of the formula (I);
      reaction products of the mono-azide compound of the formula (I);
      and/or
      polymer strands cross-linked or non-cross-linked.

10. The method according to claim 1, wherein $R^1$, $R^2$ and $R^3$ are each independently from another a halogen.

11. The method according to claim 1, wherein $R^1$, $R^2$ and $R^3$ are each F.

12. The method according to claim 1, wherein $Q^1$, $Q^2$, $R^1$, $R^2$ and $R^3$ are each F and the compound of the formula (I) is azido pentafluorobenzene.

13. A cross-linked polymer composition obtainable from the method according to claim 1.

14. An electronic device, comprising the cross-linked polymer composition according to claim 13.

* * * * *